United States Patent
Ono et al.

(10) Patent No.: US 11,102,365 B2
(45) Date of Patent: Aug. 24, 2021

(54) EDGE DETECTING DEVICE, TILT CORRECTION DEVICE, READING DEVICE, IMAGE PROCESSING APPARATUS, AND EDGE DETECTION METHOD

(71) Applicants: Tomohiko Ono, Kanagawa (JP);
Hajime Tsukahara, Kanagawa (JP);
Hiroki Shirado, Kanagawa (JP);
Ayumu Hashimoto, Kanagawa (JP);
Yuuki Nakada, Kanagawa (JP);
Tatsuya Ozaki, Kanagawa (JP);
Hiroshi Kubo, Kanagawa (JP);
Yoshiaki Nagao, Kanagawa (JP);
Kimiharu Yanagisawa, Tokyo (JP);
Masahiro Itoh, Kanagawa (JP)

(72) Inventors: Tomohiko Ono, Kanagawa (JP);
Hajime Tsukahara, Kanagawa (JP);
Hiroki Shirado, Kanagawa (JP);
Ayumu Hashimoto, Kanagawa (JP);
Yuuki Nakada, Kanagawa (JP);
Tatsuya Ozaki, Kanagawa (JP);
Hiroshi Kubo, Kanagawa (JP);
Yoshiaki Nagao, Kanagawa (JP);
Kimiharu Yanagisawa, Tokyo (JP);
Masahiro Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/841,708

(22) Filed: Apr. 7, 2020

(65) Prior Publication Data
US 2020/0336615 A1    Oct. 22, 2020

(30) Foreign Application Priority Data
Apr. 16, 2019 (JP) .............................. JP2019-078070

(51) Int. Cl.
H04N 1/04 (2006.01)
H04N 1/00 (2006.01)
(Continued)

(52) U.S. Cl.
CPC ........... H04N 1/00748 (2013.01); G06T 7/13 (2017.01); G06T 7/194 (2017.01); H04N 1/00745 (2013.01)

(58) Field of Classification Search
None
See application file for complete search history.

(56) References Cited

U.S. PATENT DOCUMENTS 9,848,104 B1 * 12/2017 Wada ................. H04N 1/00718
2005/0179963 A1    8/2005 Nagano et al.
(Continued)

FOREIGN PATENT DOCUMENTS

| JP | 5-347687 | 12/1993 |
|----|----------|---------|
| JP | 2004-062460 | 2/2004 |

(Continued)

OTHER PUBLICATIONS

U.S. Appl. No. 16/775,287, filed Jan. 29, 2020, Hajime Tsukahara, et al.
(Continued)

*Primary Examiner* — Dung D Tran
(74) *Attorney, Agent, or Firm* — Xsensus LLP

(57) ABSTRACT

An edge detecting device includes processing circuitry. The processing circuitry is configured to acquire first color information and second color information in an image including a document region and a background region outside the document region. The first color information is color information of the background region and the second color information is color information of the document region. The processing circuitry is configured to detect a
(Continued)

boundary between the background region and the document region from a change in color information between the first color information and the second color information.

13 Claims, 14 Drawing Sheets

(51) Int. Cl.
*G06T 7/194* (2017.01)
*G06T 7/13* (2017.01)

(56) References Cited

U.S. PATENT DOCUMENTS

| | | | |
|---|---|---|---|
| 2008/0137157 A1* | 6/2008 | Bannai | H04N 1/0071 358/497 |
| 2008/0218724 A1 | 9/2008 | Nishina et al. | |
| 2009/0213440 A1 | 8/2009 | Nishina et al. | |
| 2010/0225983 A1 | 9/2010 | Fujii et al. | |
| 2011/0109945 A1 | 5/2011 | Tsukahara | |
| 2012/0057210 A1 | 3/2012 | Tsukahara et al. | |
| 2013/0063788 A1* | 3/2013 | Iwayama | G06K 9/3233 358/448 |
| 2013/0215480 A1* | 8/2013 | Iwayama | H04N 1/04 358/475 |
| 2014/0043629 A1 | 2/2014 | Shirado | |
| 2014/0152690 A1* | 6/2014 | Yuda | G06T 1/60 345/612 |
| 2014/0177012 A1 | 6/2014 | Kubo et al. | |
| 2014/0376808 A1 | 12/2014 | Hashimoto | |
| 2015/0319335 A1* | 11/2015 | Baba | H04N 1/047 358/447 |
| 2017/0019547 A1 | 1/2017 | Ozaki | |
| 2017/0171428 A1* | 6/2017 | Kawano | H04N 1/00737 |
| 2017/0264782 A1 | 9/2017 | Hashimoto | |

FOREIGN PATENT DOCUMENTS

| | | |
|---|---|---|
| JP | 2015-211446 | 11/2015 |
| JP | 2017-112412 | 6/2017 |

OTHER PUBLICATIONS

U.S. Appl. No. 16/800,098, filed Feb. 25, 2020, Ayumu Hashimoto, et al.
U.S. Appl. No. 16/776,521, filed Jan. 30, 2020, Yuuki Nakada, et al.
U.S. Appl. No. 16/654,007, filed Oct. 16, 2019, Hiroshi Kubo, et al.

* cited by examiner

WITHOUT SHADOW REGION

WITH SHADOW REGION

EDGE DETECTING DEVICE, TILT CORRECTION DEVICE, READING DEVICE, IMAGE PROCESSING APPARATUS, AND EDGE DETECTION METHOD

CROSS-REFERENCE TO RELATED APPLICATION

This patent application is based on and claims priority pursuant to 35 U.S.C. § 119(a) to Japanese Patent Application No. 2019-078070, filed on Apr. 16, 2019, in the Japan Patent Office, the entire disclosure of which is hereby incorporated by reference herein.

BACKGROUND

Technical Field

Aspects of the present disclosure relate to an edge detecting device, a tilt correction device, a reading device, an image processing apparatus, and an edge detection method.

Related Art

There is known an electric skew correction technique for correcting a document skew and a main/sub misregistration in reading of an automatic document feeder (ADF), by image processing based on a skew angle and a registration position detected from an image read by ADF.

For example, in order to detect the amount of tilt of the document from the read image at the electric skew correction, there is known a technique for acquiring a tilt amount group including a plurality of tilt amounts corresponding to one of shadow edges of the document seen in the read image.

SUMMARY

In an aspect of the present disclosure, there is provided an edge detecting device that includes processing circuitry. The processing circuitry is configured to acquire first color information and second color information in an image including a document region and a background region outside the document region. The first color information is color information of the background region and the second color information is color information of the document region. The processing circuitry is configured to detect a boundary between the background region and the document region from a change in color information between the first color information and the second color information.

In another aspect of the present disclosure, there is provided a tilt correction device that includes the edge detecting device. The processing circuitry detects a tilt amount of the document region from the boundary between the background region and the document region detected by the edge detecting device and performs a tilt correction on the document region in accordance with the tilt amount detected.

In still another aspect of the present disclosure, there is provided a reading device that includes an image pickup device and the edge detecting device. The image pickup device is configured to image a document at an imaging position where a background member forms a background of the document. The edge detecting device is configured to detect the boundary between the background region as an image of the background member and the document region as an image of the document from an image captured by the image pickup device. The processing circuitry detects a tilt amount of the document region from the boundary between the background region and the document region detected by the edge detecting device and performs a tilt correction on the document region in accordance with the tilt amount detected.

In still yet another aspect of the present disclosure, there is provided an image processing apparatus that includes the reading device and an image forming device configured to form an image based on image information read by the reading device.

In still further yet another aspect of the present disclosure, there is provided an edge detection method for an edge detecting device. The edge detection method includes acquiring and detecting. The acquiring acquires first color information and second color information in an image including a document region and a background region outside the document region. The first color information is color information of the background region and the second color information is color information of the document region. The detecting detects a boundary between the background region and the document region from a change in color information between the first color information and the second color information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

Figure 1:
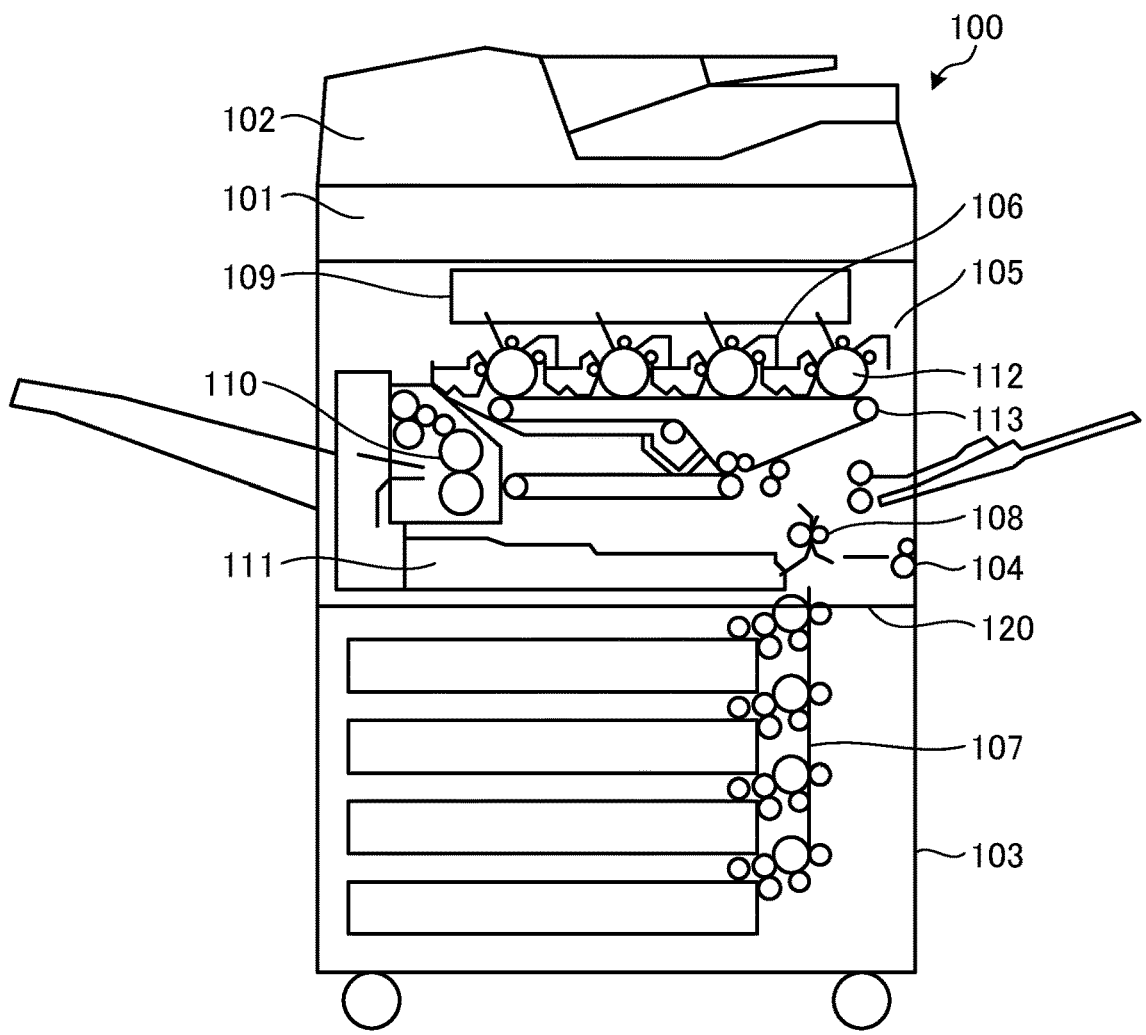
FIG. 1 is a schematic cross-sectional view of an image processing apparatus according to a first embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of an edge detecting device, a tilt correction device, a reading device, an image processing apparatus, and an edge detection method will be described in detail with reference to the accompanying drawings.

First Embodiment

FIG. 1 is a schematic cross-sectional view of an image processing apparatus 100 according to a first embodiment. The image processing apparatus 100 is a multifunction peripheral having at least two of a copy function, a printer function, a scanner function, and a facsimile function.

As illustrated in FIG. 1, the image processing apparatus 100 includes a sheet feeding device 103, a device main body 104, a scanner 101, and an automatic document feeder (ADF) 102 as a feeder.

The image processing apparatus 10 includes a plotter 120 as an image forming device in the device main body 104. The plotter 120 includes a tandem-system image formation unit 105, a registration roller 108 that supplies a recording sheet from the sheet feeding device 103 to the image formation unit 105 via a conveyance path 107, an optical writing device 109, and a fixing unit 110, and a double-sided tray 111.

The image formation unit 105 has four photoconductor drums 112 arranged in parallel corresponding to four colors of Y (yellow), M (magenta), C (cyan), and K (key plate (black)). There are arranged image formation elements including a charger, a developing device 106, a transfer device, a cleaner, and a static eliminator around each of the photoconductor drums 112.

Further, there is arranged an intermediate transfer belt 113 hung between a driving roller and a driven roller while being sandwiched between the nips of the transfer device and the photoconductor drum 112.

The thus configured tandem-system image processing apparatus 100 performs optical writing from an optical writing device 109 into the photoconductor drums 112 corresponding to the respective colors of YMCK based on a document image obtained by reading a document as a detection target sent from an ADF 102 by a scanner 101, develops the written image by the developing device 106 in toners of respective colors, and performs a primary transfer of the developed images onto the intermediate transfer belt 113 in order of Y, M C, and K, for example. Then, the image processing apparatus 100 performs a secondary transfer of the full-color image in which the four colors are superimposed by the primary transfer onto the recording sheet supplied from the sheet feeding device 103, and then fixes the image by the fixing unit 110 and ejects the sheet, thereby forming the full-color image on the recording sheet.

Next, the scanner 101 will be described.

Figure 2:
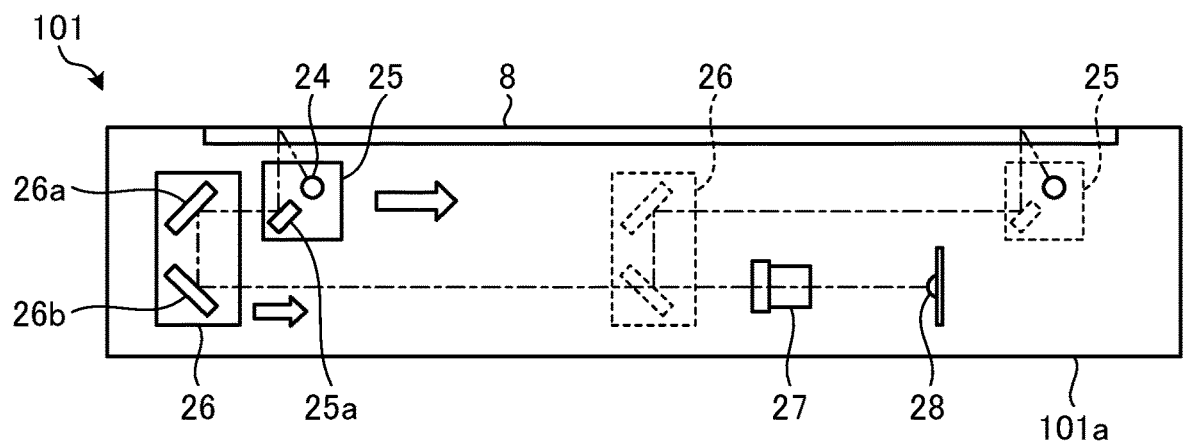
FIG. 2 is a schematic cross-sectional view of a scanner.

FIG. 2 is a schematic cross-sectional view of the scanner 101. As illustrated in FIG. 2, the scanner 101 includes a first carriage 25, a second carriage 26, an imaging forming lens 27, and an image pickup device 28 as an image pickup device. These components are arranged inside the main body frame 101a of the scanner 101.

Further, a first rail and a second rail are provided so as to extend in a sub-scanning direction (the horizontal direction in FIG. 2) inside the main body frame 101a of the scanner 101. The first rail includes two rails arranged with a predetermined space therebetween in a main-scanning direction orthogonal to the sub-scanning direction. The second rail is configured in the same manner as the first rail.

The first carriage 25 is slidably attached to the first rail and is capable of reciprocation between a position indicated by a solid line illustrated in FIG. 2 and a position indicated by a broken line illustrated in FIG. 2 in the sub-scanning direction via a first carriage driving wire by a driving motor. The first carriage 25 is provided with a light source 24 and a first mirror member 25a.

The second carriage 26 is slidably attached to the second rail and is capable of reciprocation between a position indicated by a solid line illustrated in FIG. 2 and a position indicated by a broken line illustrated in FIG. 2 in the sub-scanning direction via a second carriage driving wire by a driving motor. The second carriage 26 is provided with a second mirror member 26a and a third mirror member 26b.

Here, the first carriage 25 and the second carriage 26 move in the sub-scanning direction at a speed ratio of 2:1. Due to such a relationship of the moving speed, even if the first carriage 25 and the second carriage 26 move, the optical path length of the light from the document surface to the imaging forming lens 27 does not change.

The imaging forming lens 27 condenses the reflection light from the document entered via the mirror members and forms an image on the image pickup device 28. The image pickup device 28 is formed by an imaging element such as a charge-coupled device (CCD) to subject the image of the reflection light from the document formed via the imaging forming lens 27 to photoelectrical conversion and outputs an analog image signal as a read image.

Next, the ADF 102 mounted on the scanner 101 will be described.

Figure 3:
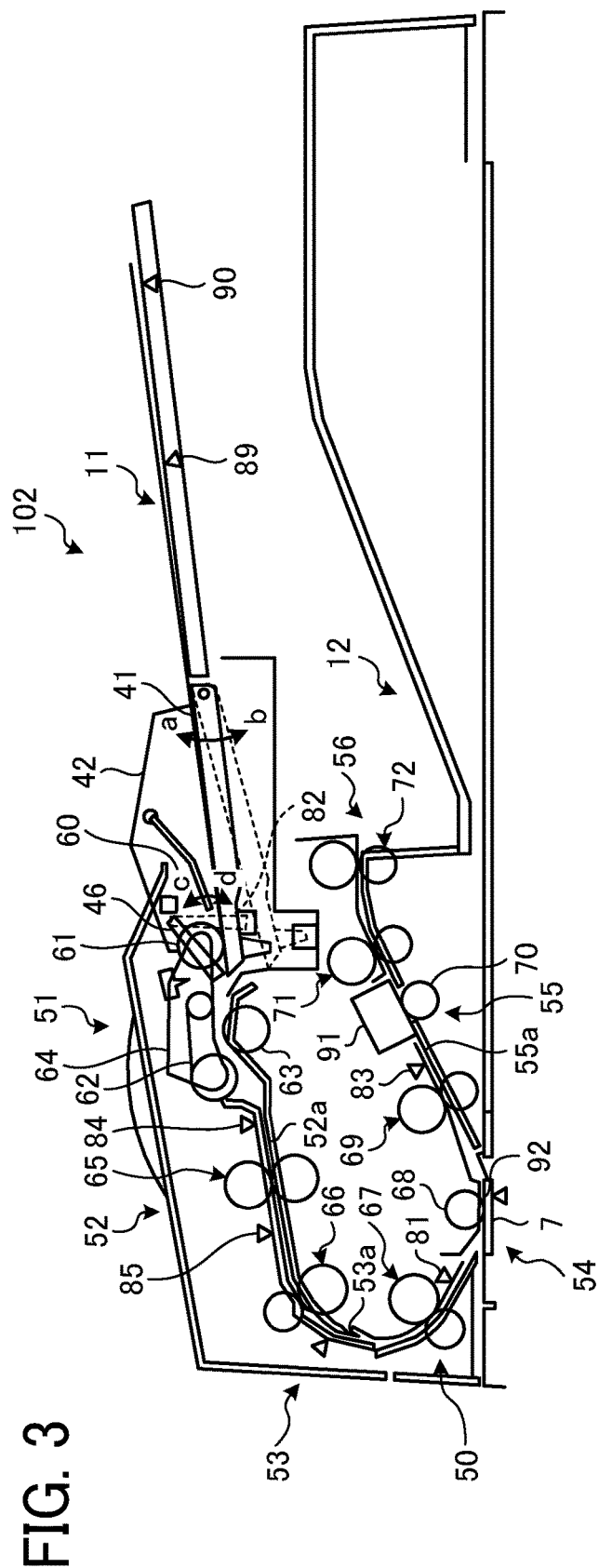
FIG. 3 is a schematic cross-sectional view of an ADF.

FIG. 3 is a schematic cross-sectional view of the ADF 102.

As illustrated in FIG. 3, the ADF 102 includes a document tray 11 on which a document is placed. The document tray 11 has a movable document table 41 that rotates in directions a and b in the drawing pivoting about the base end part and a pair of side guide plates 42 that determines left and right positions of the document with respect to the document feeding direction. The front end of the document as seen in the feeding direction is adjusted to an appropriate height by turning the movable document table 41.

Further, the document tray 11 is provided with document length detection sensors 89 and 90 for detecting whether the document is oriented vertically or horizontally, which are separated from each other in the feeding direction. In addition, as the document length detection sensors 89 and 90, reflection type sensors that detect without contact by optical means or contact type actuator sensors may be used.

The pair of side guide plates 42 has one side slidable in the horizontal direction with respect to the sheet feeding direction and is capable of placing documents of different sizes.

There is provided a set filler 46 turned by the placement of a document is provided on the fixed side of the pair of side guide plates 42. There is provided a document set sensor 82 for detecting that a document is placed on the document tray 11 at the lowermost part on the movement trajectory of the leading end of the set filler 46. That is, the document set sensor 82 detects the presence or absence of a document set on the ADF 102 depending on whether the set filler 46 has turned and come off the document set sensor 82.

The ADF 102 includes a conveyor 50 that is formed by a separation feeding unit 51, a pull-out unit 52, a turn unit 53, a first reading and conveyance unit 54, a second reading and conveyance unit 55, and a sheet ejection unit 56. Each conveyance roller of the conveyor 50 is rotationally driven by one or more conveyance motors.

The separation feeding unit 51 includes a pickup roller 61 that is arranged near a sheet feed port 60 for feeding a document, and a sheet feed belt 62 and a reverse roller 63 that are arranged so as to face each other with a conveyance route therebetween.

The pickup roller 61 is supported by a support arm member 64 attached to the sheet feed belt 62, and vertically moves in directions c and d between a contact position where the pickup roller 61 contacts a document sheaf via a cam mechanism and a separation position where the pickup roller 61 is separated from the document sheaf. The pickup roller 61 picks up several sheets (ideally, one sheet) of the document stacked on the document tray 11 at the contact position.

The sheet feed belt 62 rotates in the feeding direction, and the reverse roller 63 rotates in a direction opposite to the feeding direction. The reverse roller 63 rotates in the reverse direction with respect to the sheet feed belt 62 when the document is double-fed. However, when the reverse roller 63 is in contact with the sheet feed belt 62, or when the reverse roller 63 feeds only one sheet, the reverse roller 63 rotates following the sheet feed belt 62 by the action of a torque limiter. This prevents double feeding of the document.

The pull-out unit 52 has a pull-out roller 65 including a pair of rollers arranged to sandwich a conveyance route 52a. The pull-out unit 52 performs primary abutting alignment (so-called skew correction) of the fed document according to the drive timing of the pull-out roller 65 and the pickup roller 61, and pulls out and conveys the aligned document.

The turn unit 53 has an intermediate roller 66 and a reading entrance roller 67, which are a pair of rollers arranged so as to sandwich a conveyance route 53a curved from top to bottom. The turn unit 53 turns the document having been pulled out and conveyed by the intermediate roller 66, by conveying the document on a curved conveyance route, and conveys the document with a surface directed downward to the vicinity of a slit glass 7 as a document reading position (imaging position) by the reading entrance roller 67.

Here, the conveyance speed of the document from the pull-out unit 52 to the turn unit 53 is set to be higher than the conveyance speed in the first reading and conveyance unit 54. Thereby, the time required to convey the document to the first reading and conveyance unit 54 is shortened.

The first reading and conveyance unit 54 has a first reading roller 68 that is arranged to face the slit glass 7 and a first reading exit roller 69 that is arranged on a conveyance route 55a after reading is completed. The first reading and conveyance unit 54 conveys the document having been conveyed to the vicinity of the slit glass 7 with the surface in contact with the slit glass 7 by the first reading roller 68. At this time, the document is read by the scanner 101 via the slit glass 7. At this time, the first carriage 25 and the second carriage 26 of the scanner 101 are stopped at the home positions. The first reading and conveyance unit 54 further conveys the document after the reading by the first reading exit roller 69.

Figure 4:
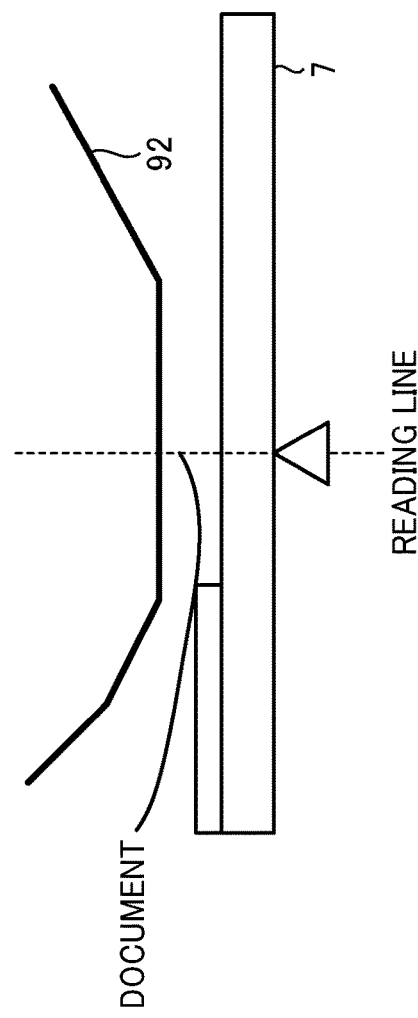
FIG. 4 is a diagram schematically illustrating a configuration near a document reading position.

FIG. 4 is a diagram schematically illustrating a configuration near the reading position of the document. Referring to FIG. 4, the document is conveyed from left to right.

As illustrated in FIG. 4, the ADF 102 includes a background member 92 serving as an imaging background at a position facing the slit glass 7. The background member 92 is, for example, a white member of which reflectance in a visible light region is uniformly high, and is used for shading correction. The document is conveyed between the slit glass 7 and the background member 92. The scanner 101 reads an image at the position of a reading line illustrated in FIG. 4.

The second reading and conveyance unit 55 includes a second reading unit 91 that reads the back surface of a document, a second reading roller 70 that is arranged to face the second reading unit 91 with the conveyance route 55a interposed therebetween, and a second reading exit roller 71 that is arranged downstream of the conveyance direction of the second reading unit 91.

In the second reading and conveyance unit 55, the back surface of the document after the front surface reading is read by the second reading unit 91. The document of which the back surface has been read is conveyed by the second reading exit roller 71 toward the sheet ejection port. The second reading roller 70 serves as a reference white part for obtaining shading data in the second reading unit 91 while suppressing the floating of the document in the second reading unit 91. When double-sided reading is not performed, the document passes through the second reading unit 91 without any processing.

The sheet ejection unit 56 is provided with a pair of sheet ejection rollers 72 near a sheet ejection port, and ejects the document conveyed by the second reading exit roller 71 to a sheet ejection tray 12.

The ADF 102 is provided with various sensors such as an abutment sensor 84, a registration sensor 81, and a sheet ejection sensor 83 along the conveyance route, and is used for controlling a conveyance distance and a conveyance speed of the document.

Further, there is provided a document width sensor 85 between the pull-out roller 65 and the intermediate roller 66. The length of the document as seen in the conveyance direction is detected from the motor pulse by reading the leading and trailing edges of the document with the abutment sensor 84 and the registration sensor 81.

Next, a hardware configuration of the image processing apparatus 100 will be described.

Figure 5:
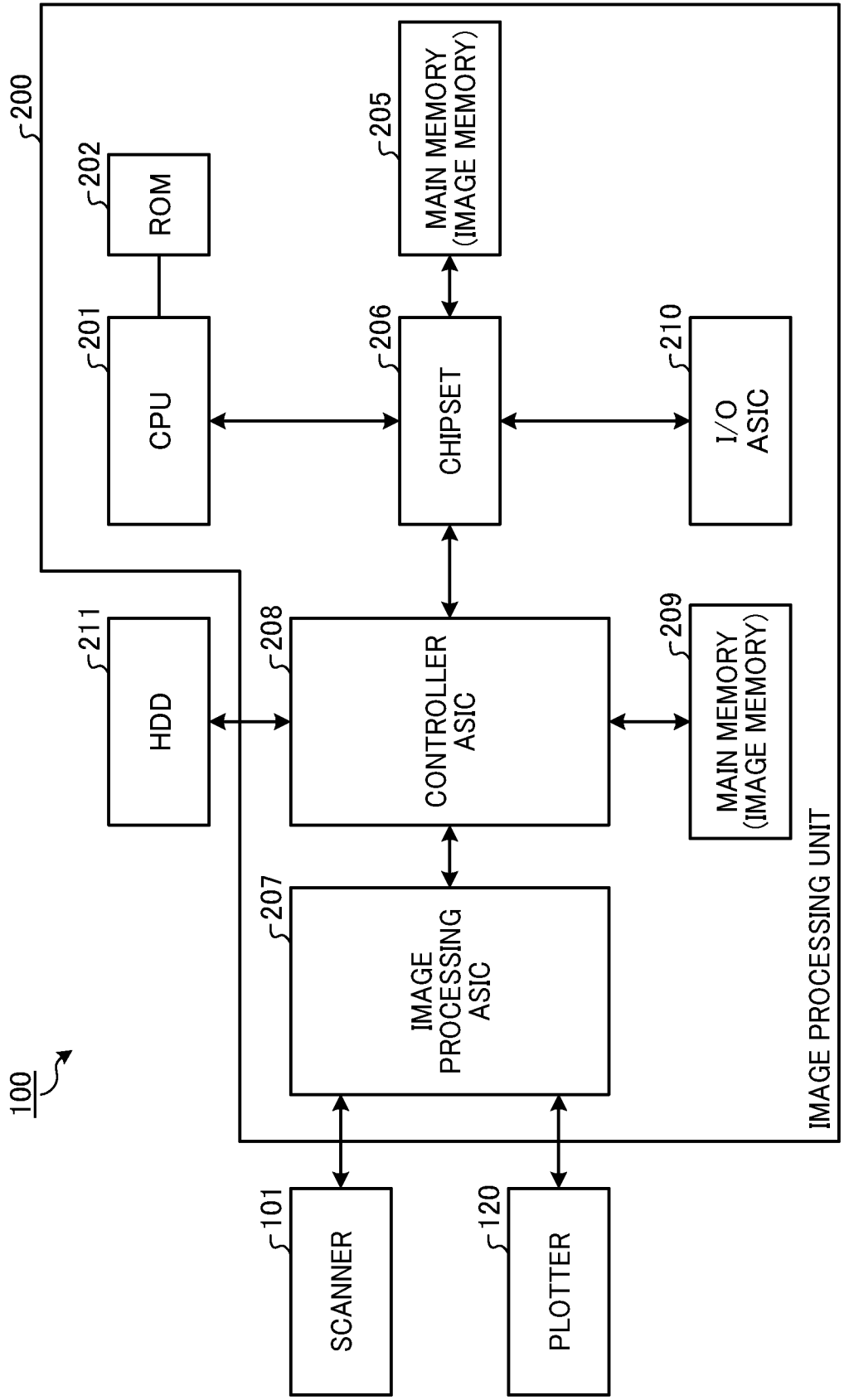
FIG. 5 is a block diagram illustrating a hardware configuration of the image processing apparatus.

FIG. 5 is a block diagram illustrating a hardware configuration of the image processing apparatus 100. As illustrated in FIG. 5, the image processing apparatus 100 is provided with an image processing unit 200 that performs predetermined processing on a document image read by the scanner 101 and outputs the processed image as image data to the plotter 120. The scanner 101, the ADF 102, and the image processing unit 200 constitute an edge detecting device, a tilt correction device, and a reading device.

The image processing unit 200 includes a central processing unit (CPU) 201, a read only memory (ROM) 202, a main memory 205, a chipset 206, an image processing application specific integrated circuit (ASIC) 207, a controller ASIC 208, a main memory 209, and an input/output (I/O) ASIC 210. ASIC is an abbreviation for application specific integrated circuit.

The CPU 201 is for controlling the image processing apparatus 100. The main memory 205 is used as a work area where programs for the CPU 201 to control the image processing apparatus 100 are expanded, and temporarily stores image data to be handled (image memory). The chipset 206 is used together with the CPU 201 and controls access to the main memory 205 by the controller ASIC 208 and the I/O ASIC 210.

The programs executed by the image processing apparatus 100 according to the present embodiment may be provided in files in an installable format or an executable format that are recorded on computer-readable recording media such as a CD-ROM, a flexible disk (FD), a CD-R, and a digital versatile disk (DVD).

The programs executed by the image processing apparatus 100 according to the present embodiment may be stored on a computer connected to a network such as the Internet and provided by being downloaded via the network. The programs executed by the image processing apparatus 100 according to the present embodiment may be provided or distributed via a network such as the Internet.

The scanner 101 has a function of reading image data to be subjected to copy processing and image data to be output to an external interface. The plotter 120 has a function of printing image data that has undergone image processing by the controller ASIC 208.

The image processing ASIC 207 performs image processing on the image data read by the scanner 101 and outputs the image data to the controller ASIC 208. The image processing ASIC 207 performs image processing on the image data from the controller ASIC 208 so that the image data can be printed by the plotter 120 or sends the image data in accordance with the print timing of the plotter 120.

The controller ASIC 208 uses the main memory 205 over the chipset 206 to rotate and edit image data handled by the image processing apparatus 100, accumulates the image data in a hard disk drive (HDD) 211, and transmits and receives the image data to and from the image processing ASIC 207. The main memory 209 is used as an image memory with which the controller ASIC 208 performs image processing. The HDD 211 is used to temporarily store image data having undergone image processing.

The I/O ASIC 210 is an external interface for providing the image processing apparatus 100 with additional functions. For example, the I/O ASIC 210 includes a network interface, a universal serial bus (USB), a secure digital (SD) card, an operation unit, interfaces such as serial peripheral interface (SPI), inter-integrated circuit (I2C), and the document width sensor 85, a hardware accelerator for accelerating image processing, an encryption processing circuit, and others.

Next, functions performed by the image processing unit 200 will be described.

Figure 6:
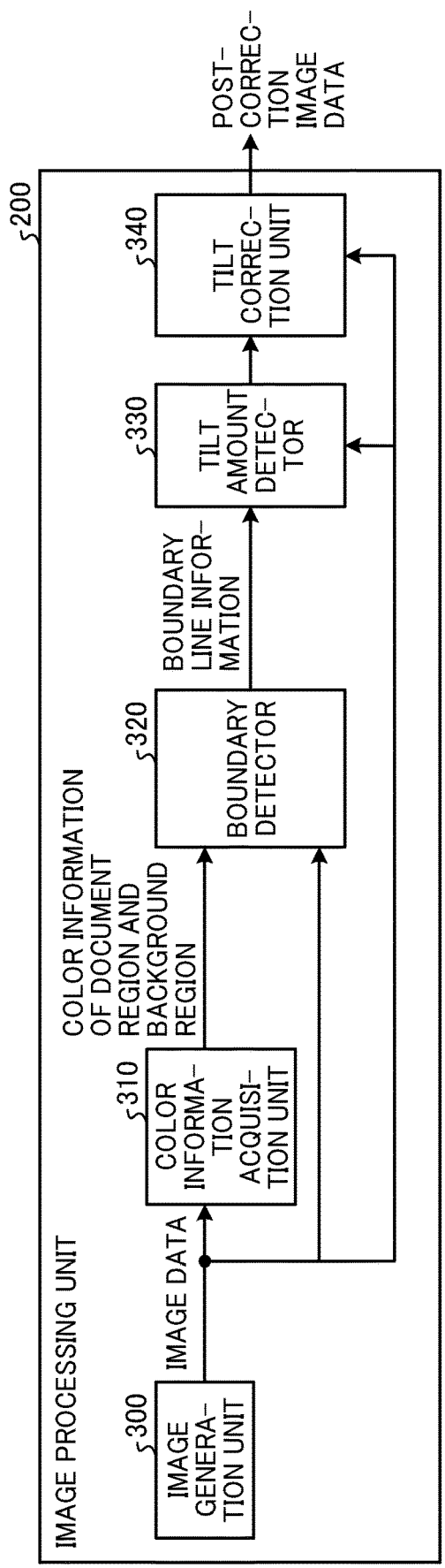
FIG. 6 is a block diagram illustrating functions of an image processing unit.

FIG. 6 is a block diagram illustrating the functions of the image processing unit 200. Among the functions performed by the image processing unit 200, characteristic functions according to the present embodiment will be described here.

As illustrated in FIG. 6, the image processing unit 200 includes an image generation unit 300, a color information acquisition unit 310 as color information acquisition means, a boundary detector 320 as boundary detection means, a tilt amount detector 330 as tilt amount detection means, and a tilt correction unit 340 as tilt correction means. In the present embodiment, the image processing ASIC 207 includes the image generation unit 300, and the controller ASIC 208 includes the color information acquisition unit 310, the boundary detector 320, the tilt amount detector 330, and the tilt correction unit 340. Note that the present disclosure is not limited to such a configuration, and the CPU 201 may execute the programs to implement the color information acquisition unit 310, the boundary detector 320, the tilt amount detector 330, and the tilt correction unit 340.

The image generation unit 300 irradiates a document with light at the time of passing through the slit glass 7 as a document reading position (image pickup position), reads reflection light from the document by the image pickup device 28, and generates digital image data as image information (hereinafter referred to as image data) based on an analog image signal obtained from the reflection light.

Figure 7:
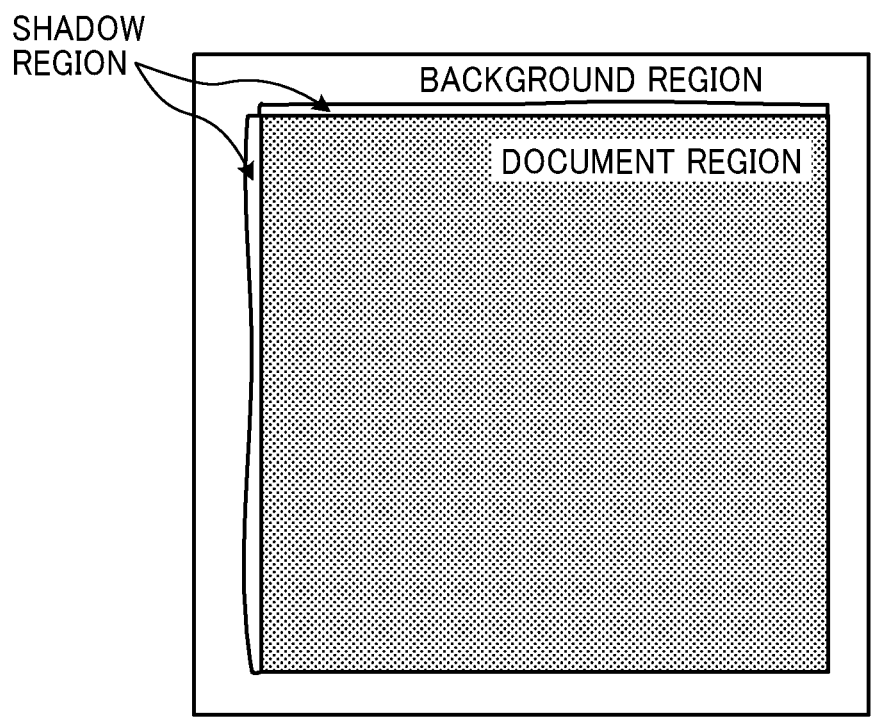
FIG. 7 is a diagram illustrating an example of image data.

FIG. 7 is a diagram illustrating an example of image data.

As illustrated in FIG. 7, the image data includes a "document region" that is an information area of a document part and a "background region" that is an information area of the background member 92 located outside the document region and serving as a background. In addition, the image data has a shadow region at the boundary between the background region and the document region. When the background member 92 is a white member of which reflectance in the visible light region is uniformly high, the shadow region between the background region and the document region is formed in any visible light wavelength region. Since the change in the pixel value becomes significant due to the shadow region, the edge detection rate is improved. Although FIG. 7 illustrates a shadow region only near the upper side and the left side of the document, the shadow region actually occurs near all the contours of the document.

If the distance between the document and the background member 92 is constant in the main-scanning direction, the width of the shadow region is uniform in the main-scanning direction. However, depending on the state of the document, the shadow of the document may not be formed. In this case, there is a disadvantage in that the edge detection fails and an erroneous tilt amount (angle) is detected.

The color information acquisition unit 310 acquires color information (background color and the like) from part of the background region and part of the document region in the image data, and outputs the acquired color information to the boundary detector 320.

The boundary detector 320 detects a boundary (boundary line) between the background region and the document region from a change in color information between the two pieces of color information input from the color information acquisition unit 310, and outputs the boundary line information to the tilt amount detector 330.

The tilt amount detector 330 detects the tilt amount (skew amount) of the document from the detection result of the boundary line between the background region and the document region in the image data.

The tilt correction unit 340 corrects the tilt based on the tilt amount (skew amount) of the document detected by the tilt amount detector 330, and outputs the corrected image data to the subsequent stage.

Next, the processing performed by the color information acquisition unit 310 will be described in detail.

Figure 8:
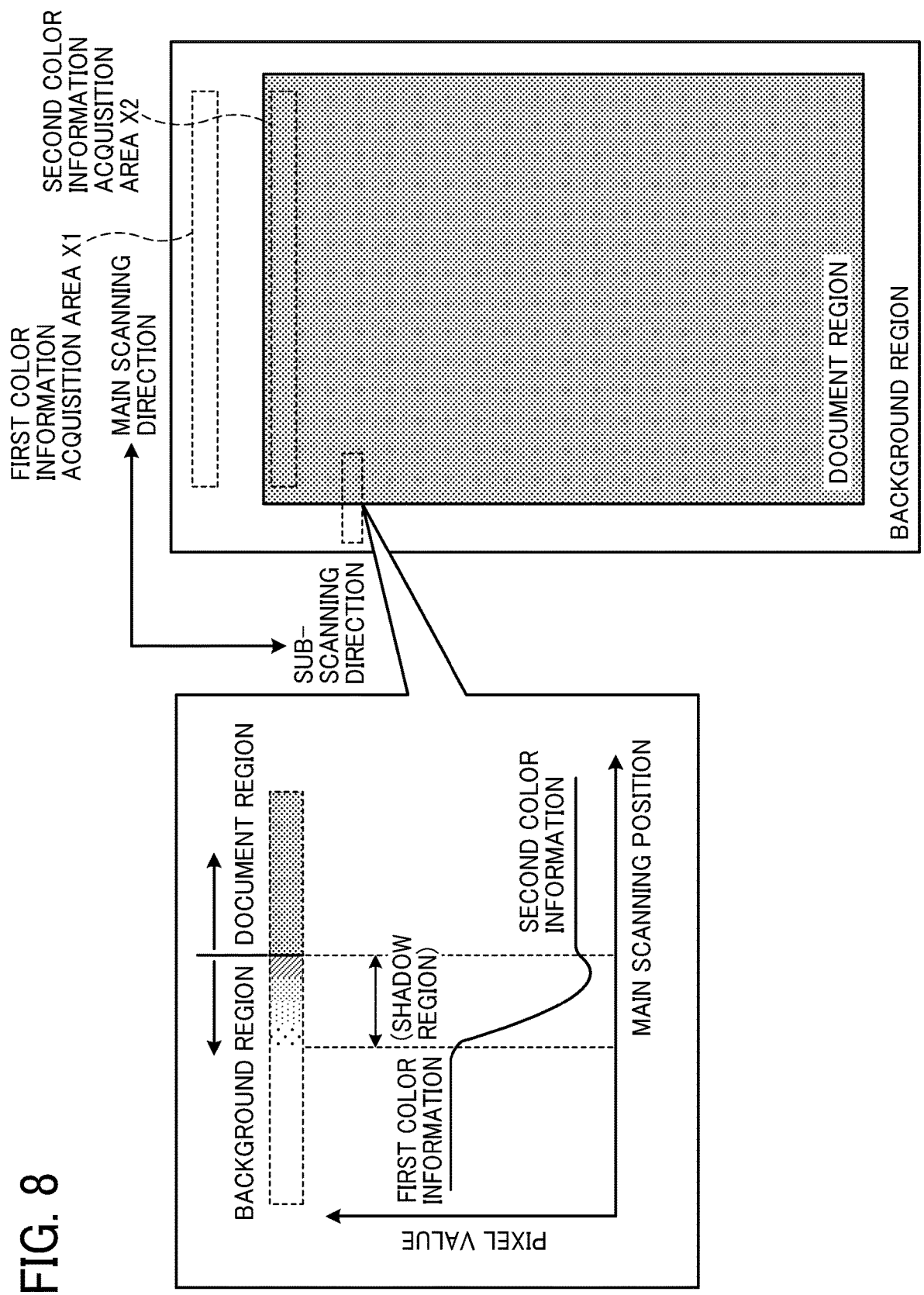
FIG. 8 is a diagram schematically illustrating an outline of processing performed by a color information acquisition unit.

FIG. 8 is a diagram schematically illustrating an outline of the processing performed by the color information acquisition unit 310. As illustrated in FIG. 8, the color information acquisition unit 310 first acquires pixel values of a part of a predefined background region in image data on a memory, and acquires first color information indicating the color information of the background region from the amount of statistics (for example, average value) of the pixel values. In the example illustrated in FIG. 8, it is assumed that the first color information is acquired from a first color information acquisition area X1, which is an area above the background region (illustrated by a broken-line rectangle).

In addition, the color information acquisition unit 310 acquires pixel values of a part of a predefined document region in image data on the memory, and acquires second color information indicating the color information of the document region from the amount of statistics (for example, average value) of the pixel values. In the example illustrated in FIG. 8, it is assumed that the second color information is acquired from a second color information acquisition area X2 which is an area above the document region (illustrated by a broken-line rectangle).

Figure 9A:
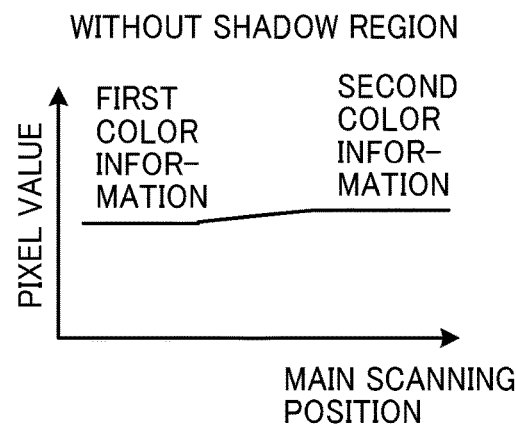
FIGS. 9A and 9B are diagrams illustrating a case where the success or failure of edge detection changes depending on the presence or absence of a shadow region.
Figure 9B:
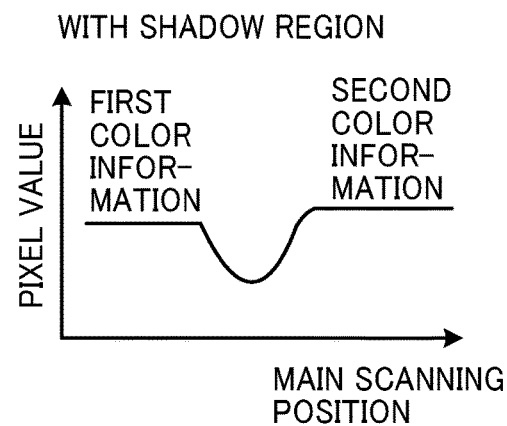

When the color of the background region is uniform and the color of the part near the outline of the document region is the same as the base color of the document, the pixel values near the boundary between the background region and the document region are substantially as follows in the main-scanning direction as illustrated on the left side of FIG. 8. First color information to shadow region color information to second color information If the first color information and the second color information can be said to be equivalent, the success or failure of edge detection may change depending on the presence or absence of a shadow region. FIGS. 9A and 9B are diagrams illustrating a case where the success or failure of edge detection changes depending on the presence or absence of a shadow region. FIG. 9A illustrates a case without a shadow region, and FIG. 9B illustrates a case with a shadow region. When there is no shadow region as illustrated in FIG. 9A, edge detection is difficult. Therefore, in performing edge detection, it is preferable that the amount of change in the pixel value in the shadow region is large. Conditions for large change amount include a high reflectance of the background member 92 and a low transmittance of the document. In the present embodiment, using a white member having a uniform high reflectance in the visible light region as the background member 92 characteristically increases changes in the pixel value in the shadow region irrespective of the peak wavelength of the light source and enhances the possibility of successful edge detection.

Further, the "color information" in the present embodiment is information including pixel values of one or more components such as red, green, and blue. According to the present embodiment, the success rate of edge detection can be increased by selecting a component to be noted from components included in the color information depending on a combination of the document region and the background region in an image.

In the present embodiment, the pixel values of the red, green, and blue components are used. However, the present disclosure is not limited to such pixel values. For example, the color information may be formed based on CMYK values, tristimulus values (XYZ). Lab values in a Lab space, or the like. Further, the color information is not limited to the information based on visible light as described above but may include information based on infrared or ultraviolet light (invisible light) that is not visible light.

Next, the processing performed by the boundary detector 320 will be described in detail.

Figure 10A:
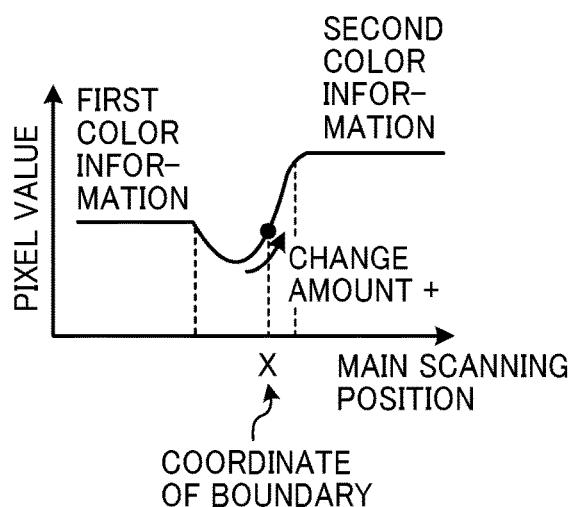
FIGS. 10A and 10B are diagrams schematically illustrating an outline of processing performed by a boundary detector.
Figure 10B:
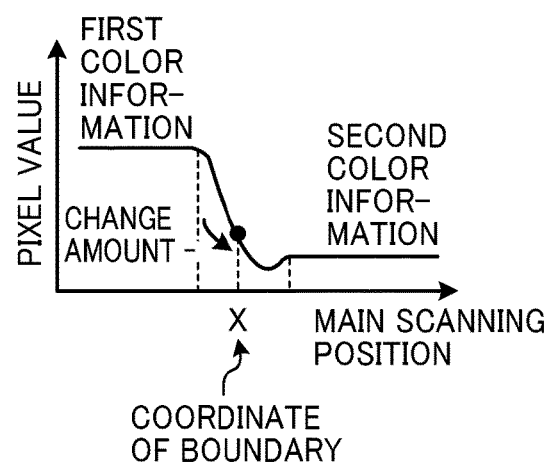

FIGS. 10A and 10B are diagrams schematically illustrating an outline of the processing performed by the boundary detector 320. As illustrated in FIGS. 10A and 10B, the boundary detector 320 checks the amount of change in the pixel values focusing on a specific main-scanning position or a specific sub-scanning position. In the present embodiment, as illustrated in FIG. 8, it is assumed that the amount of change in the pixel values in the main-scanning direction is examined focusing on the specific sub-scanning position.

The boundary detector 320 estimates the position of the boundary between the document region and the background region based on changes in color information (the amount of change in pixel value) between the first color information and the second color information. For example, as illustrated in FIGS. 10A and 10B, the boundary detector 320 changes a method for detecting a boundary point between the background region and the document region according to the magnitude relationship between the first color information and the second color information acquired by the color information acquisition unit 310.

The following two cases A and B will be described here.

Case A

First color information<second color information (for example, when the document has a higher reflectance than the background member)

In the case A, as illustrated in FIG. 10A, as the pixel value is plotted, the pixel value decreases in the shadow region and increases when entering the document region, thereby forming a curve with a downward recess. At this time, the boundary detector 320 examines the amount of change in the pixel value of a target pixel from a pixel adjacent to the target pixel, and detects a point where the change amount becomes positive or a point where the change amount becomes continuously positive as a boundary point.

Case B

First color information>second color information (when the document is higher in density than the background member, or when the pixel value further drops from the shadow region in the document region)

In the case B, as illustrated in FIG. 10B, as the pixel value is plotted, the pixel value decreases in the shadow region, and in the document region, the density of the document is higher than that in the shadow region, and thus the pixel value is slightly higher or further lower than that in the shadow region. Therefore, the boundary between the background portion and the document portion is often located in the vicinity of the portion where the amount of change in the pixel value is negative. At this time, the boundary detector 320 examines the amount of change in the pixel value of a target pixel from a pixel adjacent to the target pixel, and detects a point where the change amount becomes negative or a point where the change amount becomes continuously negative as a boundary point.

Detection of the boundary point at a part where the amount of change is continuously positive or negative will be described. As described above, at the part where the amount of change is continuously positive or negative, the start point, middle point, end point, and the like of the continuous part can be set as a boundary point. However, which of the start point, the middle point, and the end point of the continuous part is set to the boundary point varies depending on the state of the document and the like.

As described above, the boundary detector 320 estimates coordinate X of a point (boundary point between the background region and the document region) on the boundary between the background member and the document from a change in color information (a change in pixel value) between the first color information and the second color information.

Then, the boundary detector 320 repeats the above estimation with a change in the main-scanning position or the sub-scanning position, and determines a set (boundary point group) of the coordinates X of the points on the boundary between the background member and the document (the boundary point between the background region and the document region).

Figure 11:
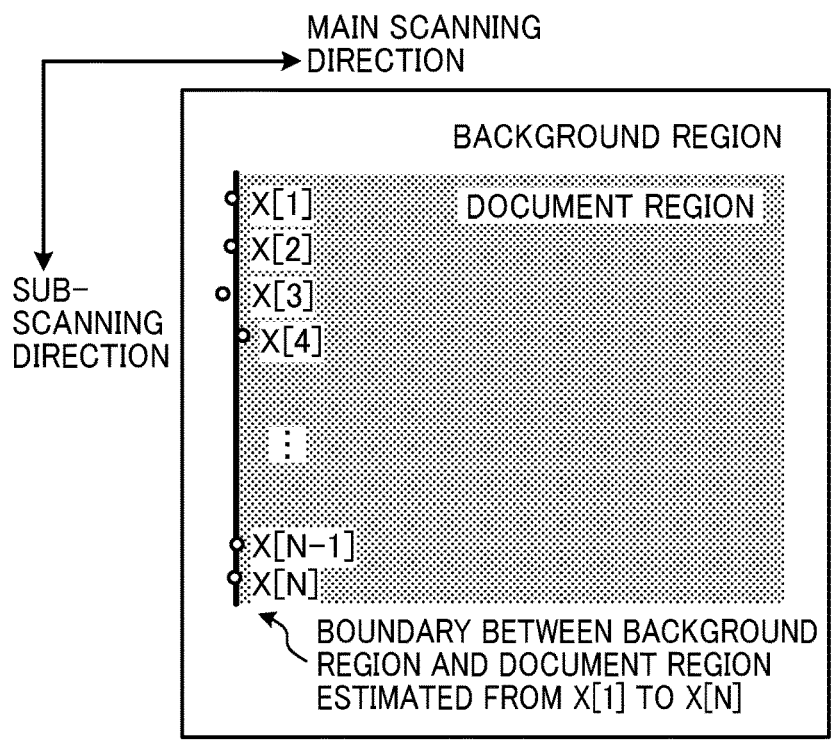
FIG. 11 is a diagram illustrating an example of detection (estimation) of a boundary line from a boundary point group.

The tilt amount detector 330 estimates a boundary line as an edge of the document from the set of the coordinates X of the points on the boundary between the background member and the document (the boundary point between the background region and the document region) determined by the boundary detector 320, and detects the tilt amount (skew amount) of the document. FIG. 11 is a diagram illustrating an example of detection (estimation) of a boundary line from a boundary point group. The example illustrated in FIG. 11 illustrates detection (estimation) of a boundary line that is a boundary between the background region and the document region from the boundary point groups X[1] to X[N].

Here, a method of detecting the tilt amount (skew amount) of the document in the tilt amount detector 330 will be described.

Figure 12:
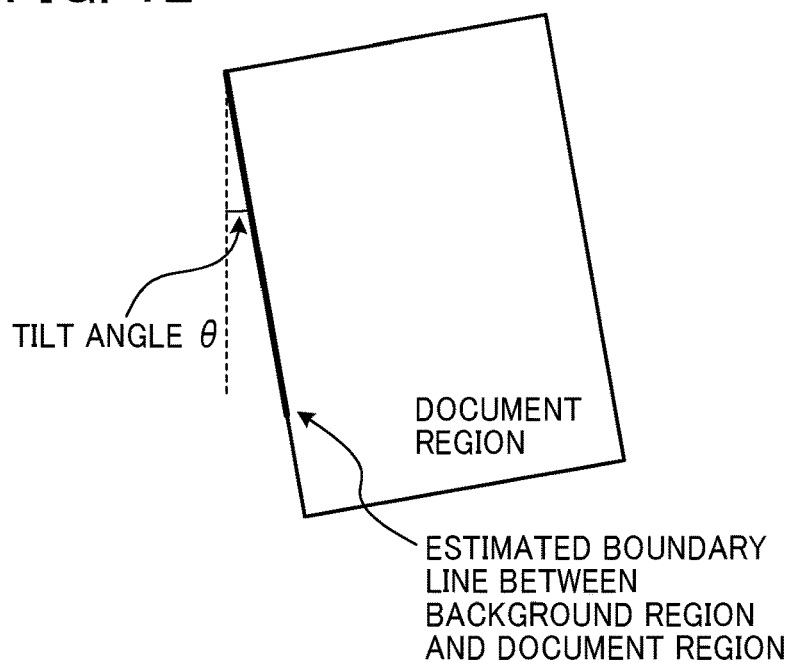
FIG. 12 is a diagram illustrating a method of detecting the amount of tilt (skew amount) of a document.

FIG. 12 is a diagram illustrating a method of detecting the tilt amount (skew amount) of the document. As illustrated in FIG. 12, the tilt amount detector 330 calculates a tilt angle θ of a document region image based on a linear equation of the estimated boundary line between the background region and the document region.

The tilt correction unit 340 also performs a rotation process such as a matrix operation on the image information in the document region according to the angle θ calculated by the tilt amount detector 330. As an example of the rotation process, the information of the pixels existing at coordinates (x,y) is transferred to coordinates (x', y') by the matrix operation illustrated below, whereby the tilt of the image information in the document region can be corrected.

[Equation 1]

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x \\ y \end{bmatrix} \quad (1)$$

As described above, according to the present embodiment, regardless of the shape of the shadow region formed between the background region and the document region in the image data, the tilt of the document can be detected from the change in the color information near the boundary between the background region and the document region, which makes it possible to detect the edge of the document with high accuracy.

Figure 13A:
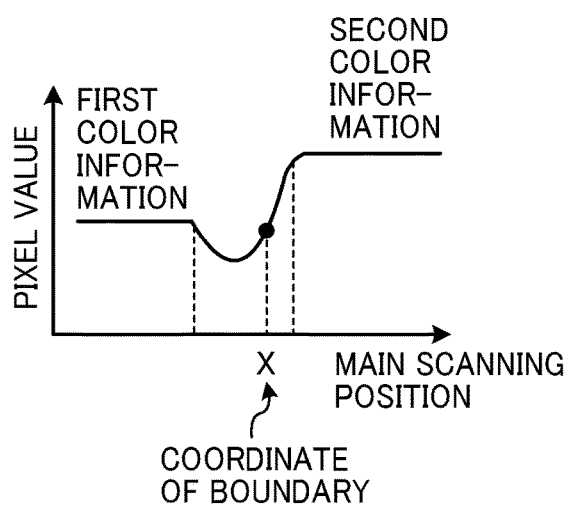
FIGS. 13A and 13B are diagrams schematically illustrating other examples of outline of the processing performed by the boundary detector.
Figure 13B:
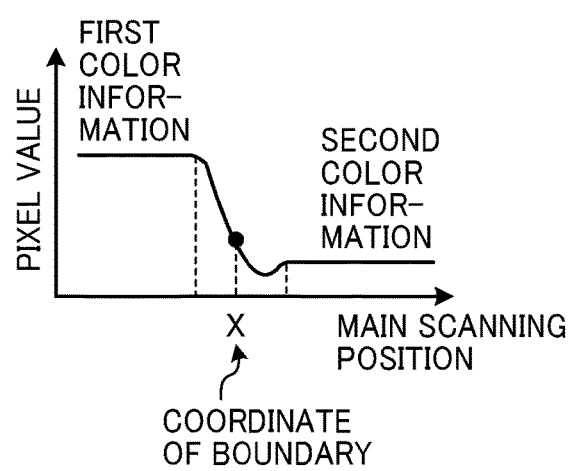

In the present embodiment, the position of the boundary between the document region and the background region is estimated based on the amount of change in the pixel value. However, the present disclosure is not limited to such a configuration. FIGS. 13A and 13B are diagrams schematically illustrating another example of outline of the processing performed by the boundary detector 320. As illustrated in FIGS. 13A and 13B, the boundary detector 320 may examine the pixel value focusing on a specific main-scanning position or a specific sub-scanning position. As illustrated in FIG. 8, it is assumed that the pixel value is examined in the main-scanning direction focusing on a specific sub-scanning position.

The boundary detector 320 estimates the position of the boundary between the document region and the background region based on changes (pixel value) in color information between the first color information and the second color information. For example, as illustrated in FIGS. 13A and 13B, when the pixel value continuously increases by a predetermined value or more between the pixel value of the first color information and the pixel value of the second color information, the boundary detector 320 estimates one of these continuous pixel values as the position of the boundary between the document region and the background region. When the pixel value continuously decreases by a predetermined value or more between the pixel value of the first color information and the pixel value of the second color information, the boundary detector 320 estimates one of the continuous pixel values as the position of the boundary between the document region and the background region.

Thereby, regardless of the shape of the shadow region formed between the background region and the document region in the image data, the tilt of the document can be detected from the change in the color information near the boundary between the background region and the document region, which makes it possible to detect the edge of the document with high accuracy.

Second Embodiment

Next, a second embodiment will be described.

The second embodiment differs from the first embodiment in that an enhancement filter (such as a first-order differential filter) is added. Hereinafter, in the description of the second embodiment, the description of the same parts as those of the first embodiment will be omitted, and the points different from the first embodiment will be described.

Figure 14A:
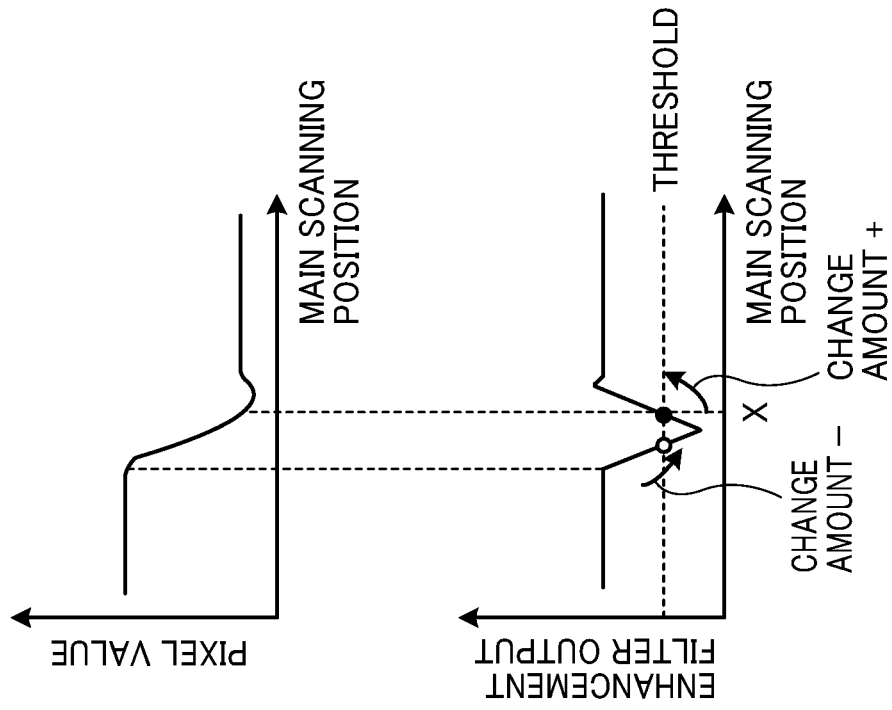
FIGS. 14A and 14B are diagrams schematically illustrating an outline of processing performed by a boundary detector according to a second embodiment.
Figure 14B:
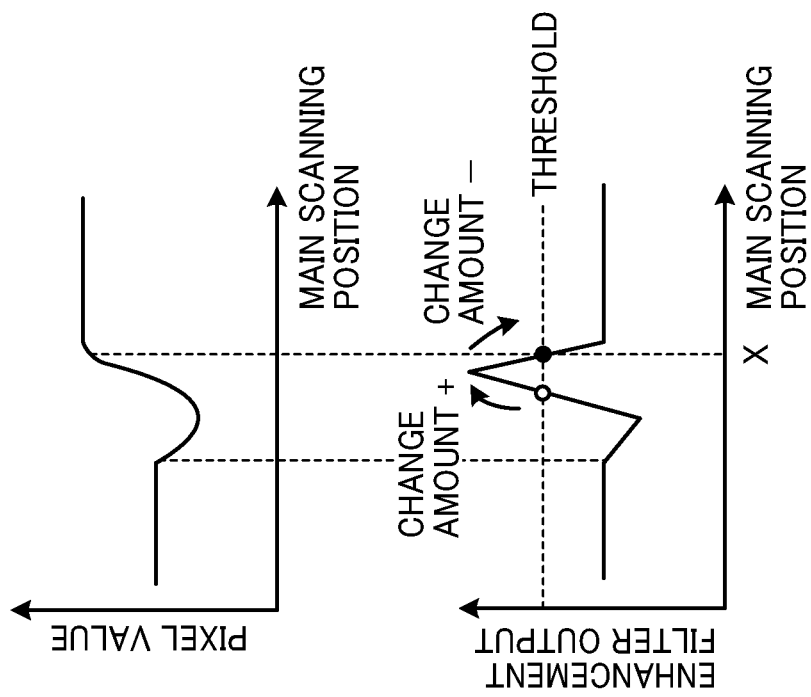

FIGS. 14A and 14B are diagrams schematically illustrating an outline of processing performed by a boundary detector 320 according to the second embodiment. As illustrated in FIGS. 14A and 14B, the boundary detector 320 checks the amount of change in the pixel values focusing on a specific main-scanning position or a specific sub-scanning position. In the present embodiment, as illustrated in FIG. 8, it is assumed that the amount of change in the pixel values in the main-scanning direction is examined focusing on the specific sub-scanning position.

The boundary detector 320 estimates a point where the amount of change in the pixel value is larger than a predetermined amount as a point on the boundary. In the present embodiment, an enhancement filter (such as a primary differential filter) is added to make it easier to detect a change in the pixel value. That is, the boundary detector 320 estimates a point on the boundary from the output of the enhancement filter. For example, as illustrated in FIGS. 14A and 14B, the boundary detector 320 changes a method for detecting a boundary point between the background region and the document region according to the magnitude relationship between the first color information and the second color information acquired by the color information acquisition unit 310. The following two cases A and B will be described here.

Case A

First color information<second color information (for example, when the document has a higher reflectance than the background member)

In the case A, as illustrated in FIG. 14A, the output of the enhancement filter forms a curve including a region having an upward convex shape. In this case, the boundary detector 320 sets a threshold on the upper side, and detects a point crossing the threshold as a boundary point.

In the example illustrated in FIG. 14A, when a point that crosses the threshold for the first time (illustrated by a white circle in the diagram) is set as a boundary point, there occurs a deviation of the detected position from the actual position of the boundary line. In order to suppress the deviation, it is preferable to detect a part closer to the document region as a boundary point. As an example of the method, as illustrated in FIG. 14A, the output value of the enhancement filter is checked in the main-scanning direction, and the part that has a negative change amount (tilt) and crosses the threshold is detected as a boundary point.

Case B

First color information>second color information (when the document is higher in density than the background member, or when the pixel value further drops from the shadow region in the document region)

In the case B, as illustrated in FIG. 14B, the output of the enhancement filter forms a curve including a region having a downward concave shape. In this case, the boundary detector 320 sets a threshold on the lower side, and detects a point crossing the threshold as a boundary point.

Also in the example illustrated in FIG. 14B, it is preferable to detect a part closer to the document region as a boundary point as described above. In this case, the boundary point near the document region can be detected by detecting a part that has a positive change amount (tilt) and crosses the threshold as a boundary point.

Generally, the pixel value greatly changes at the boundary between the background region and the document region. Therefore, the position of the boundary can be accurately detected by detecting a part where the pixel value greatly changes.

Thus, according to the present embodiment, it is possible to perform accurate edge detection by appropriately setting the threshold in a configuration to which an enhancement filter (a first-order differential filter or the like) is added.

Third Embodiment

Next, a third embodiment will be described.

The third embodiment is different from the first embodiment and the second embodiment in that, when there is no pixel exceeding the threshold, the threshold is updated and a pixel exceeding the threshold is searched for again. Hereinafter, in the description of the third embodiment, the description of the same parts as those of the first and second embodiments will be omitted, and the points different from the first and second embodiments will be described.

Figure 15B:
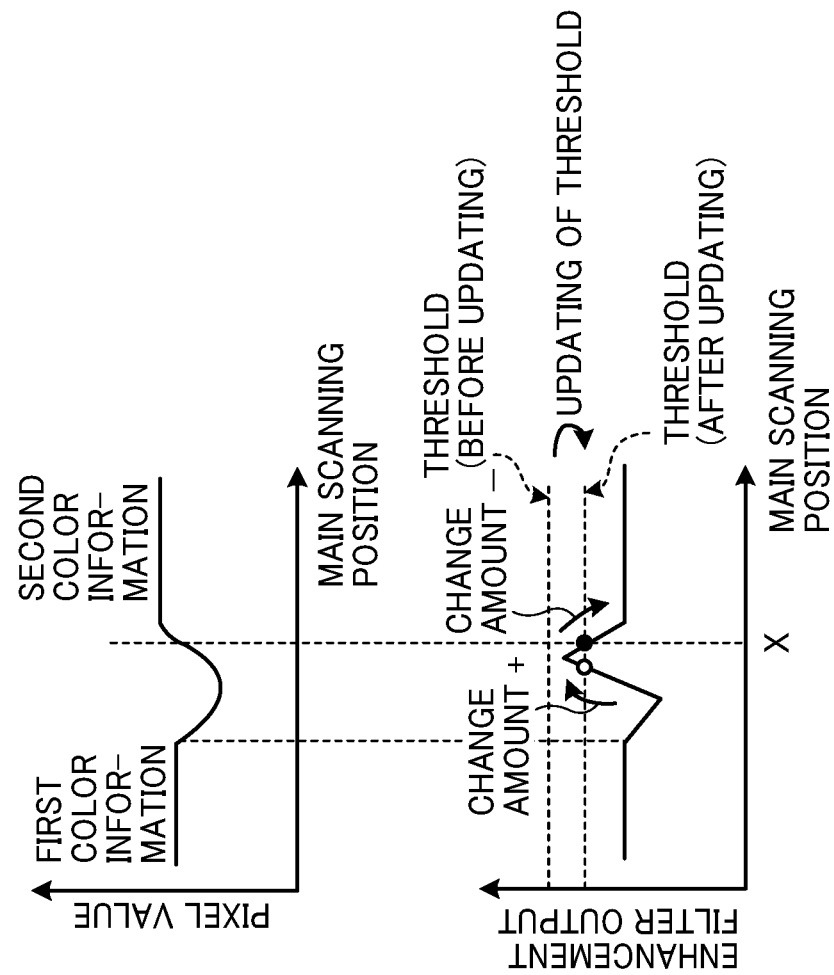
FIGS. 15A and 15B are diagrams schematically illustrating an outline of processing performed by a boundary detector according to a third embodiment.
Figure 15A:
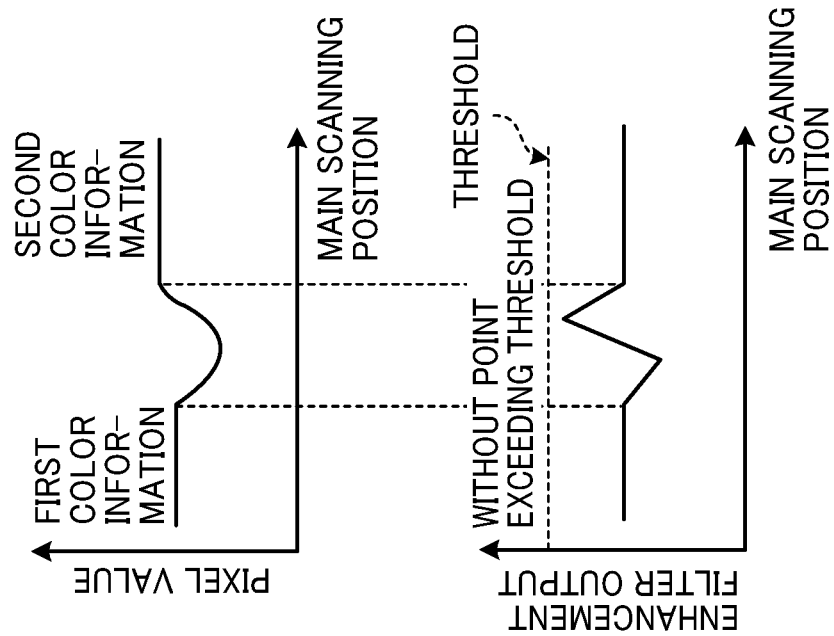

FIGS. 15A and 15B are diagrams schematically illustrating an outline of processing performed by a boundary detector 320 according to the third embodiment. As illustrated in FIG. 15A, depending on the combination of the colors of the document region and the background region, the values indicated by the first color information and the second color information may be close to each other. In this case, there is a possibility that the boundary detector 320 fails to detect a boundary point because there is no pixel exceeding the threshold.

Therefore, in the boundary detector 320 according to the present embodiment, as illustrated in FIG. 15B, when there is no pixel exceeding the threshold, the threshold is updated, and a pixel exceeding the threshold is searched for again. For example, the boundary detector 320 sets the updated threshold to a predetermined value or sets the updated threshold based on a difference between the first color information and the second color information.

Thus, according to the present embodiment, it is possible to increase the success rate of detecting the boundary point even when the color information of the document region and the color information of the background region are similar.

Fourth Embodiment

Next, a fourth embodiment will be described.

The fourth embodiment is different from the first to third embodiments in evaluating the magnitude of a difference between components of two pieces of color information (first color information and second color information). Hereinafter, in the description of the fourth embodiment, the description of the same parts as those of the first to third embodiments will be omitted, and the points different from the first to third embodiments will be described.

Figure 16B:
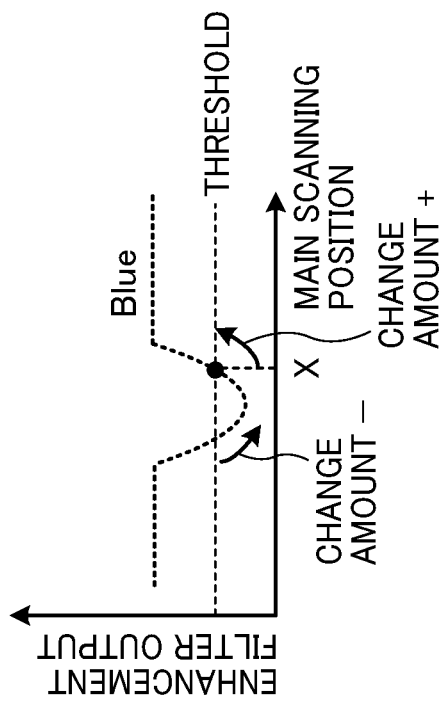
FIGS. 16A and 16B are diagrams schematically illustrating an outline of processing performed by a boundary detector according to a fourth embodiment.
Figure 16A:
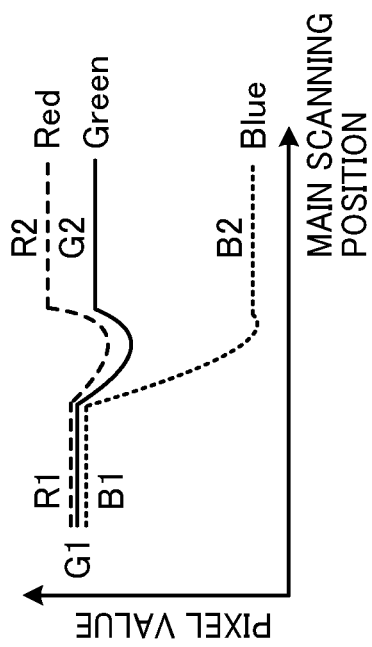

FIGS. 16A and 16B are diagrams schematically illustrating an outline of processing performed by the boundary detector 320 according to the fourth embodiment. The present embodiment is effective in a case where the color information (first color information) of a background member 92 and the color information (second color information) of a document include a plurality of components (for example, three components of red, green, and blue). Hereinafter, a case where the color information includes three components (red, green, and blue) will be described as an example. The first color information that is the color information of the background member 92 is expressed as (R1, G1, and B1), and the second color information that is the color information of the document is expressed as (R2, G2, and B2).

As illustrated in FIGS. 16A and 16B, the boundary detector 320 evaluates the magnitude of the difference between the components of two pieces of color information (first color information and second color information).

As a simple example, the boundary detector 320 can evaluate the magnitude of the difference with $\text{Diff\_*}$ determined by the following equation: $\text{Diff\_*}=|*2-*|(*=R, G, B)$ Subsequently, the boundary detector 320 compares the values of the value of $\text{Diff\_*}$ among the three components red, green, and blue, and selects the component having the largest value.

Thereafter, the boundary detector 320 detects a boundary point only for the selected component.

According to the present embodiment, it is possible to implement more accurate detection of a boundary point in the following case, for example. Background members: White (R1≈G1≈B1) Document: Yellow (R2≈G2>B2) Also, R1≈R2, G1≈G2 In the example illustrated in FIG. 16A, the read values in the background region and the document region can be said to be substantially equivalent from the information of the red and green components, but there is a large difference in the read value between the background region and the document region for the blue component. In this case, since $\text{Diff\_B}$ is the largest among $\text{Diff\_R}$, DiFF_G, and DiFF_B, the boundary between the background and the document is detected based on the blue component.

Thus, according to the present embodiment, if an image including a plurality of components has a large difference in color information between the document region and the background region even for only one of the components, the background region and the document region can be accurately detected.

Fifth Embodiment

Next, a fifth embodiment will be described.

The fifth embodiment is different from the first to fourth embodiments in that the operation is changed according to the statistics regarding the color information of the background region and the document region. Hereinafter, in the description of the fifth embodiment, the description of the same parts as those of the first to fourth embodiments will be omitted, and the points different from the first to fourth embodiments will be described.

Figure 17:
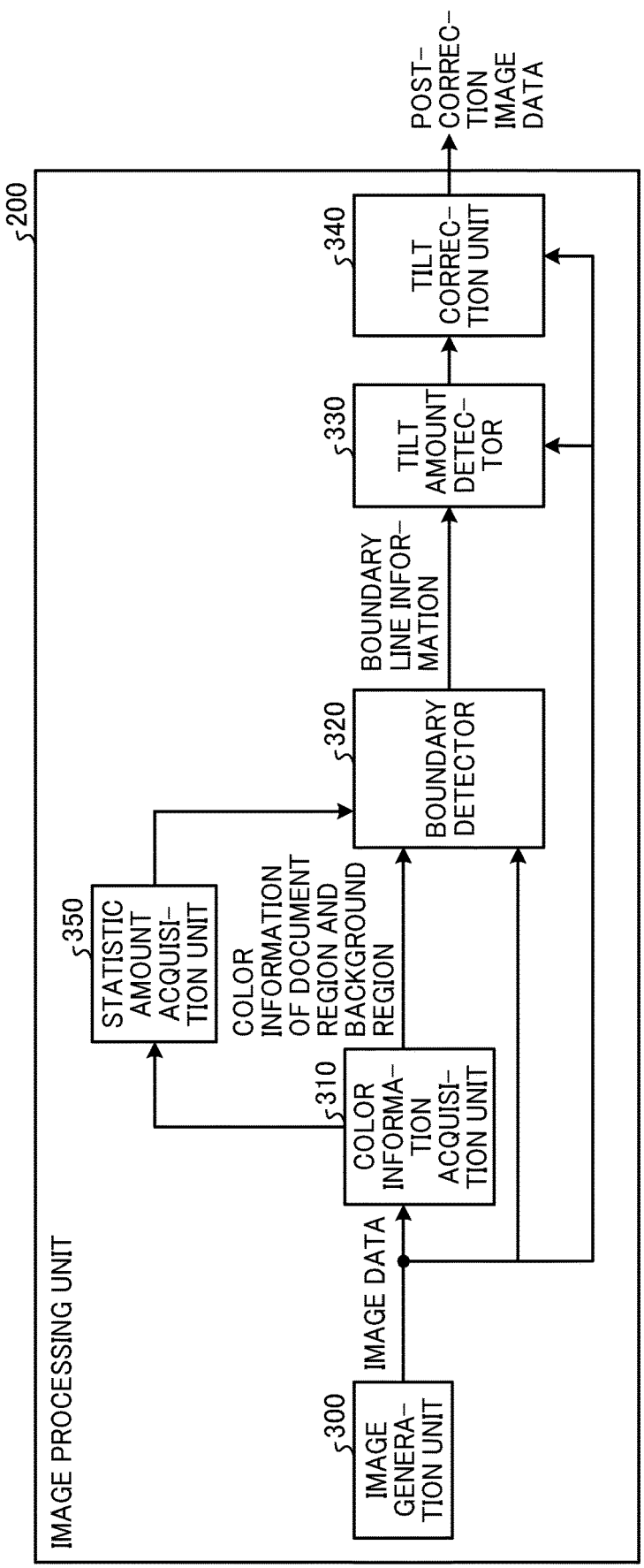
FIG. 17 is a block diagram illustrating functions of an image processing unit according to a fifth embodiment.

FIG. 17 is a block diagram illustrating functions of an image processing unit 200 according to the fifth embodiment. As illustrated in FIG. 17, the image processing unit 200 according to the fifth embodiment further includes a statistics acquisition unit 350 that is a statistic acquisition means.

The statistic acquisition unit 350 acquires statistics related to the color information of the background region and the document region. Then, the boundary detector 320 changes the operation depending on the statistics acquired by the statistics acquisition unit 350.

Figure 18:
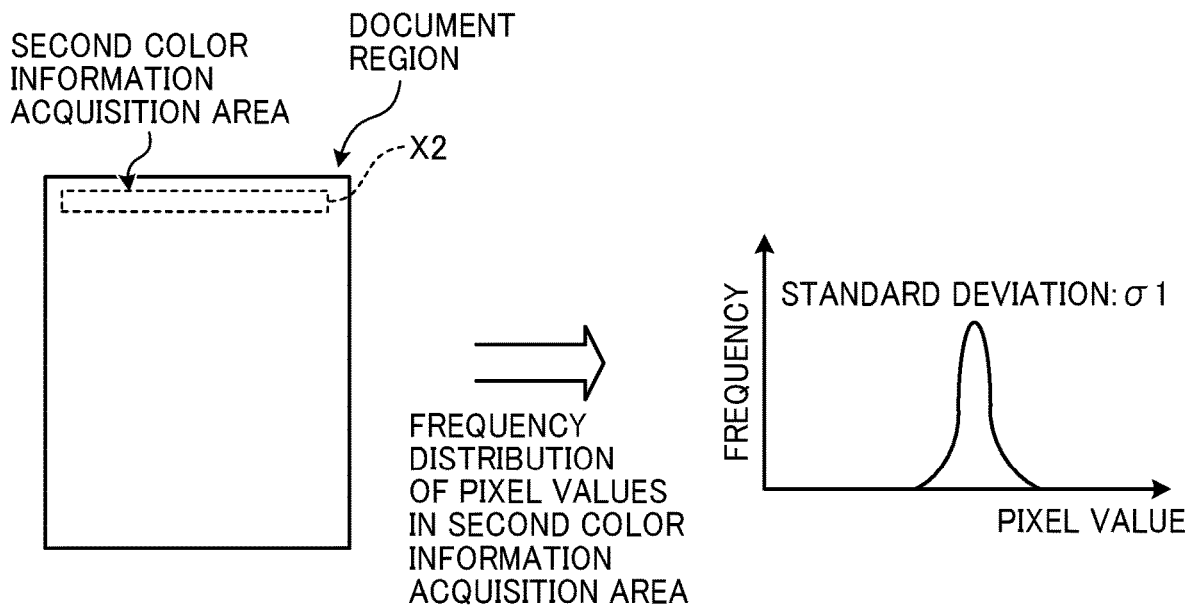
FIG. 18 is a diagram illustrating a frequency distribution example when pixel values in a second color information acquisition area are uniform.
Figure 19:
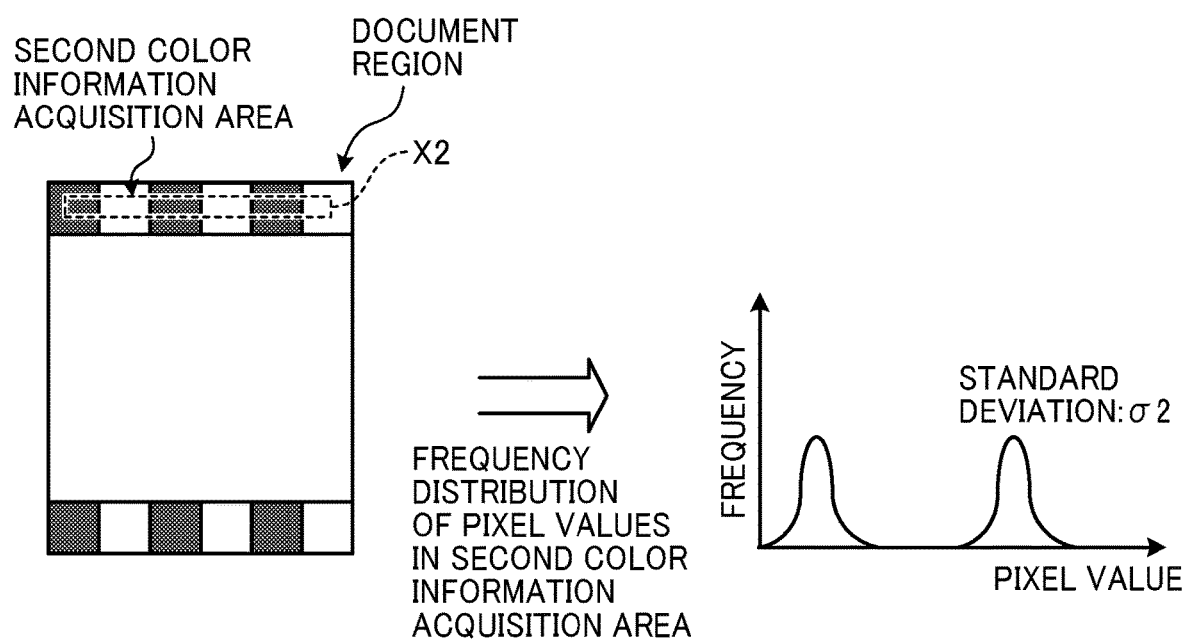
FIG. 19 is a diagram illustrating a frequency distribution example when pixel values in a second color information acquisition area are non-uniform. The accompanying drawings are intended to depict embodiments of the present disclosure and should not be interpreted to limit the scope thereof. The accompanying drawings are not to be considered as drawn to scale unless explicitly noted.

FIG. 18 is a diagram illustrating an example of frequency distribution where the pixel values in the second color information acquisition area are uniform, and FIG. 19 is diagram illustrating an example of frequency distribution where the pixel values in the second color information acquisition area are non-uniform. In the first to fourth embodiments, it is assumed that the pixel values in the second color information acquisition area X2 as illustrated in FIG. 18, for example, are substantially uniform. However, in actuality, the pixel values in the second color information acquisition area X2 may not be uniform as illustrated in FIG. 19, for example. Further, not only the pixel values in the second color information acquisition area X2 but also the pixel values in the first color information acquisition area X1 similarly may not be uniform. As illustrated in FIG. 19, when the acquired color information is non-uniform depending on the location, the values indicated by the color information used in the boundary detector 320 vary depending on the method of determining the values indicated by the color information and the pattern of the image of the document part. In this case, the reliability of the detected boundary line is impaired. Therefore, in the present embodiment, the statistic acquisition unit 350 acquires the statistics related to the color information included in the background region or the document region, and the boundary detector 320 changes the operation based on the statistics. The operation of the boundary detector 320 is changed, for example, such that no boundary detection is performed or the result of boundary detection is rejected depending on the statistics of the pixel values of the document region.

The statistic acquisition unit 350 acquires, for example, a standard deviation (σ1 illustrated in FIG. 18 and σ2 illustrated in FIG. 19; σ1<σ2 at this time) as a statistic of the pixel values in the color report acquisition area.

When either the standard deviation σ1 or the standard deviation σ2 exceeds a predetermined value, the boundary detector 320 determines that the pixel values in the color information area are non-uniform, and does not perform the boundary detection. For example, in the example illustrated in FIG. 19, since the standard deviation σ2 exceeds a predetermined value, the boundary detection is not performed.

In addition, when determining not to perform the boundary detection in a situation as illustrated in FIG. 19, for example, the boundary detector 320 may prompt the user to make a retry after changing the color of the background region. This makes it possible to construct a system that increases the success rate of boundary detection.

Thus, according to the present embodiment, since it is considered that performing image processing based on low-reliability edge information makes it more prone to cause an abnormality rather than in a case of performing no image processing, the edge detection is not performed (or the detection result is rejected) when it can be deemed that the edge will not be correctly detected, thereby to increase the reliability of the detected boundary line.

In each of the above embodiments described above, the boundary between the background region and the document region detected by the edge detecting device is used to correct the tilt amount of the document. However, the present disclosure is not limited to such a configuration. The boundary between the background region and the document region detected by the edge detecting device may be used for a process of extracting only document information from the image (trimming) or a position correction process (registration adjustment).

In each of the embodiments described above, the image processing apparatus is applied to a multifunction peripheral having at least two of a copy function, a printer function, a scanner function, and a facsimile function as an example. However, the present disclosure can be applied to any of image processing apparatuses such as copy machine, printer, scanner, facsimile, and the like.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An edge detecting device comprising processing circuitry configured to:
  acquire first color information and second color information in an image including a document region and a background region outside the document region, the first color information being color information of the background region and the second color information being color information of the document region; and detect a boundary between the background region and the document region from a change in color information between the first color information and the second color information,
wherein the color information includes pixel values of a plurality of color components in the image, each of the plurality of color components corresponding to a different one of a plurality of colors in the image, and
wherein the processing circuitry selects a color component having a largest difference between the first color information and the second color information and detects the boundary between the background region and the document region based on a pixel value of the selected color component.

2. The edge detecting device according to claim 1, wherein the processing circuitry detects the boundary between the background region and the document region based on a change amount in the pixel value of the selected color component between the first color information and the second color information, detects a relationship in magnitude between the first color information and the second color information, and changes a method of detecting the boundary between the background region and the document region according to the relationship in magnitude.

3. The edge detecting device according to claim 2, wherein the processing circuitry detects the boundary between the background region and the document region from a position of a pixel of which a change amount of a pixel value between a target pixel and a neighboring pixel of the target pixel exceeds a predetermined value.

4. The edge detecting device according to claim 3, wherein, when there is no pixel of which the change amount of the pixel value between the target pixel and the neighboring pixel exceeds the predetermined value, the processing circuitry changes the predetermined value and searches for a pixel of which the change amount of the pixel value exceeds the predetermined value.

5. The edge detecting device according to claim 1, wherein, when pixel values of the selected color component continuously increase or decrease between the first color information and the second color information, the processing circuitry sets any of the continuously increasing or decreasing pixel values to a position of the boundary between the document region and the background region.

6. The edge detecting device according to claim 1, wherein the processing circuitry acquires statistics related to the color information, and
wherein the processing circuitry acquires statistics of pixel values from a part of the document region and a part of the background region and selects an operation based on the statistics of the pixel values.

7. A tilt correction device comprising the edge detecting device according to claim 1,
wherein the processing circuitry detects a tilt amount of the document region from the boundary between the background region and the document region detected by the edge detecting device and performs a tilt correction on the document region in accordance with the tilt amount detected.

8. A reading device comprising:
an image pickup device configured to image a document at an imaging position where a background member forms a background of the document; and
the edge detecting device according to claim 1 configured to detect the boundary between the background region as an image of the background member and the document region as an image of the document from an image captured by the image pickup device,
wherein the processing circuitry detects a tilt amount of the document region from the boundary between the background region and the document region detected by the edge detecting device and performs a tilt correction on the document region in accordance with the tilt amount detected.

9. The reading device according to claim 8, further comprising
a feeder configured to feed the document to the imaging position,
wherein the image pickup device images the document when the document is passed through the imaging position by the feeder.

10. The reading device according to claim 8,
wherein the background member is a white member.

11. An image processing apparatus comprising:
the reading device according to claim 8; and
an image forming device configured to form an image based on image information read by the reading device.

12. The edge detecting device according to claim 1,
wherein the color components comprise
red, green, and blue color components,
cyan, magenta, yellow, and black color components,
tristimulus color components, or
Lab space color components.

13. An edge detection method for an edge detecting device, comprising:
acquiring first color information and second color information in an image including a document region and a background region outside the document region, the first color information being color information of the background region and the second color information being color information of the document region; and
detecting a boundary between the background region and the document region from a change in color information between the first color information and the second color information,
wherein the color information includes pixel values of a plurality of color components in the image, each of the plurality of color components corresponding to a different one of a plurality of colors in the image, and
wherein the method comprises selecting a color component having a largest difference between the first color information and the second color information and detecting the boundary between the background region and the document region based on a pixel value of the selected color component.

* * * * *